United States Patent [19]

Golston

[11] 4,219,290
[45] Aug. 26, 1980

[54] PNEUMATIC CARRIER

[76] Inventor: Sam W. Golston, 1913 Marshall Rd., Denton, Tex. 76201

[21] Appl. No.: 910,758

[22] Filed: May 30, 1978

[51] Int. Cl.² .............................................. B65G 51/06
[52] U.S. Cl. .................................................... 406/186
[58] Field of Search ........................ 243/32, 33, 34, 35, 243/39; 406/184–187, 190

[56] References Cited

U.S. PATENT DOCUMENTS

| 242,459 | 6/1881 | Leaycraft | 243/34 X |
| 1,169,553 | 1/1916 | MacMillan | 243/34 |
| 3,593,948 | 7/1971 | McClellan | 243/34 |
| 3,825,210 | 7/1974 | Weaver | 243/34 |

FOREIGN PATENT DOCUMENTS 599765 3/1948 United Kingdom ...................... 243/34

OTHER PUBLICATIONS

LeFebure's "Tel-Air System Five" Advertising Manuel.
8×10 black and white photography copy of a national safe company pneumatic carrier.
8×10 black and white photograph copy of LeFebure, Meilink, Diebold and Mosler pneumatic carriers.

*Primary Examiner*—Jeffrey V. Nase
*Attorney, Agent, or Firm*—Richards, Harris & Medlock

[57] ABSTRACT

An improved side opening pneumatic carrier is used in a remote transaction pneumatic tube delivery system. A pair of symmetrical semicylindrical shells are provided with interior end pieces on one end and exterior end pieces on the opposite end. Hinges are formed along one longitudinal edge of each of the semicylindrical shells for joining the shells and forming a generally cylindrical carrier in the closed position. The external end piece on each end of the shells is dimensioned to closely engage the interior walls of the pneumatic tubes, so that the carrier cannot be inserted into the system unless it is completely closed. A lever attached to each of the internal end pieces is fitted within an opening of the opposite external end piece and biased by a spring assembly to maintain the semicylindrical shells in a normally closed position. The carrier is opened by rotating each of the external end pieces in opposing directions, thereby providing easy access to the contents of the carrier and preventing the carrier from being opened when it is within the pneumatic tube delivery system.

3 Claims, 10 Drawing Figures

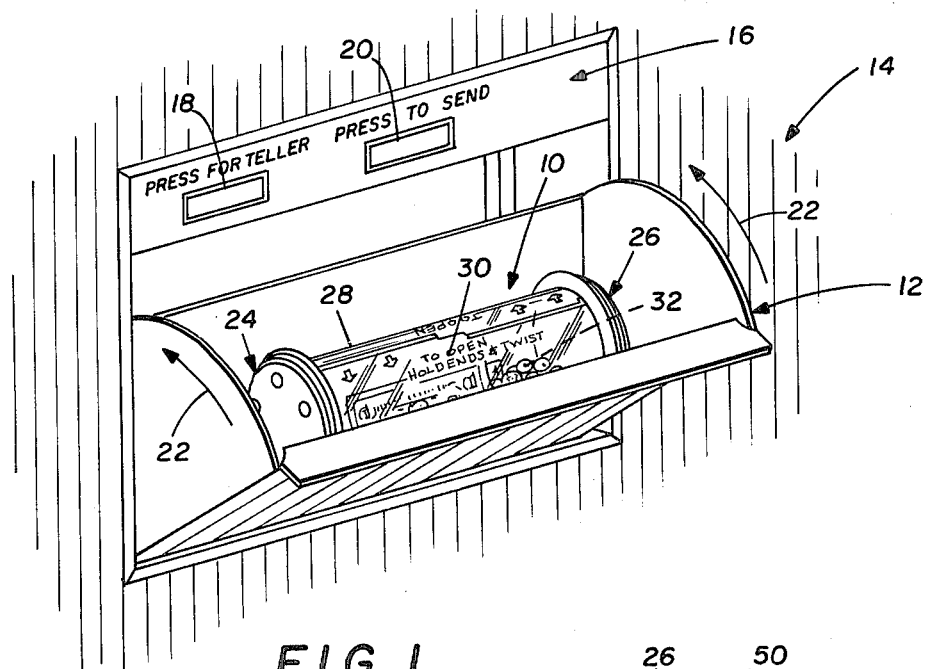
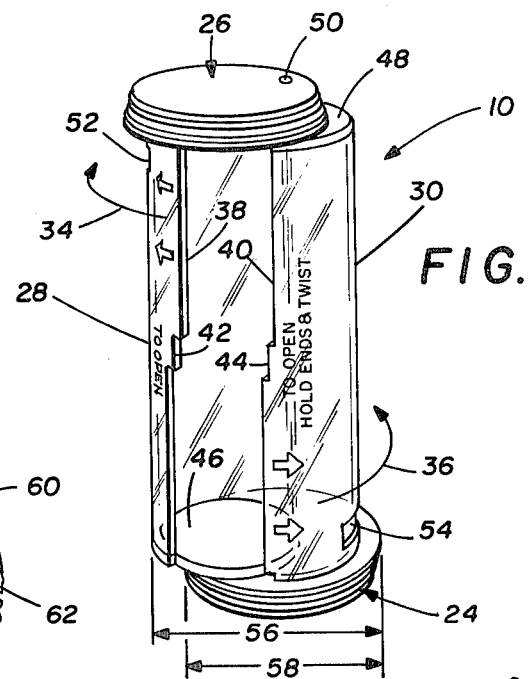
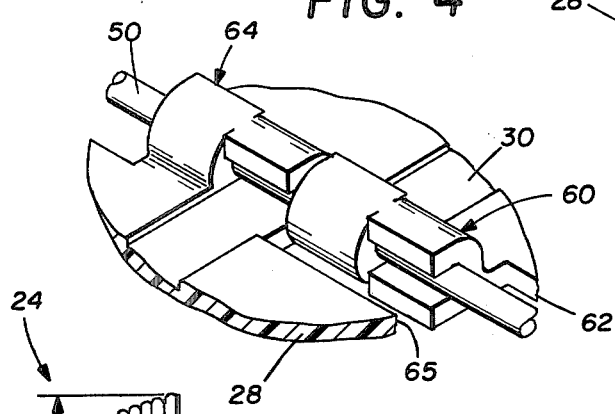
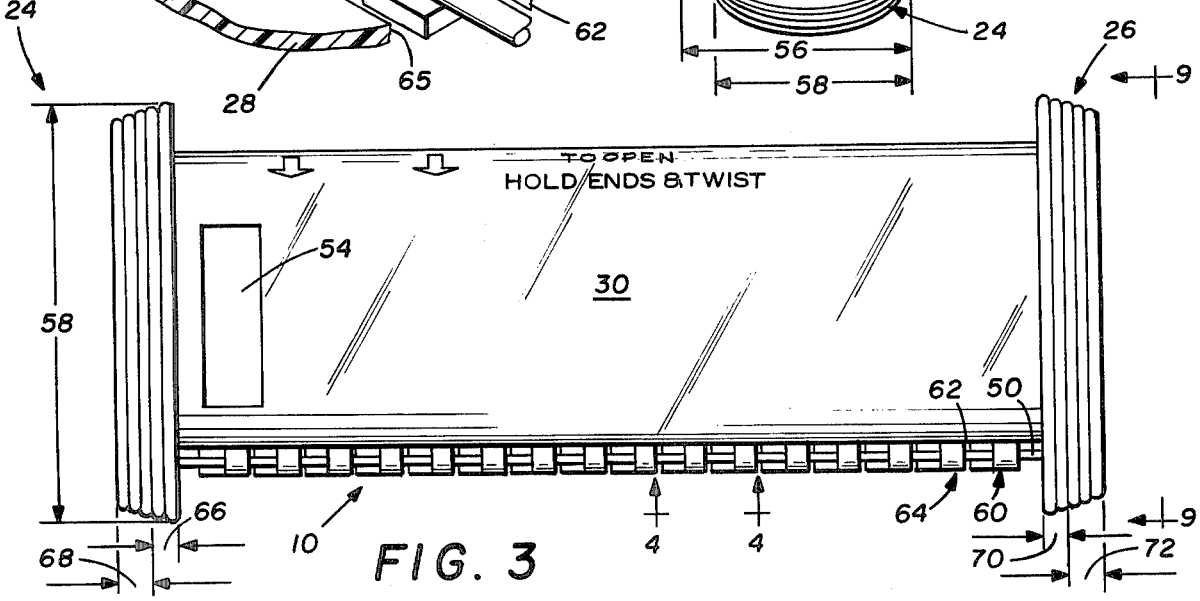

PNEUMATIC CARRIER

FIELD OF THE INVENTION

This invention relates to side opening pneumatic carriers for use in pneumatic tube delivery systems, more particularly to a side opening pneumatic carrier having two semicylindrical shells hinged together for movement between an open and closed position by rotating the end pieces of the shells in opposing directions to prevent the carrier's insertion in the delivery system in a partially closed position and to prevent the opening of the carrier during transit within the delivery system.

DESCRIPTION OF THE PRIOR ART

Pneumatic delivery systems are used extensively for the rapid and efficient transportation of a wide variety of articles. These delivery systems are used in a number of business operations, including banks, hospitals, office buildings, industrial plants, and truck terminals as a few examples. Pneumatic carriers for use in such delivery systems come in a wide range of sizes and shapes to accommodate the physical articles to be transported in the system. As an example, pneumatic carriers are provided for transporting cash, messages, stock transaction slips, letters, blueprints, electronic data processing cards, x-rays, pharmaceutical supplies, and a variety of other small physical objects.

Pneumatic delivery systems are popularly utilized in drive-in motor banks to provide a fast and convenient way of handling customer banking transactions. The pneumatic delivery system enables the banking customer to quickly complete his banking transactions without having to leave his automobile. In a typical pneumatic tube system installed in a drive-in bank, a kiosk or customer receiving terminal is positioned on an island adjacent a motor vehicle driveway. This terminal usually includes a two-way sound system so the banking customer may communicate with the teller located in some remote building. The terminal is connected to the teller's building through underground pneumatic tubes. A pneumatic carrier is accessible from the kiosk for the customer to send cash, checks, or other banking transaction papers to the bank teller through the pneumatic tubes. The pneumatic carriers and the pneumatic tube systems vary, but the pneumatic carrier for drive-in banks is generally a cylindrical carrier with circular air rings for engaging the internal walls of a circular pneumatic tube.

There are presently a variety of pneumatic carriers used in remote transaction banking systems. One type of pneumatic carrier is the end opening type, whereby the customer has access to the carrier by placing his thumb in an indentation on an end panel of the carrier and rotates the end cap against some spring resistance. Such end opening pneumatic carriers have several disadvantages, including the difficulty initially encountered in opening such a carrier and the inability to remove paper objects or other small objects wedged within the carrier. The inside diameter of the carrier is too small to permit a hand to enter the carrier to retrieve an object lodged inside. When an article becomes lodged in such a container, both ends of the container must be opened to insert some device to dislodge the matter from the carrier. When such problems are encountered with remote transaction pneumatic carriers, many prospective motor banking customers are discouraged from using such convenient facilities. In particular, elderly persons often find it difficult to follow the instructions to open such end opening carriers and lack the physical strength or manual dexterity necessary to open these carriers.

Another existing type of pneumatic carrier is the side opening carrier. The side opening carrier has an advantage over the end opening carrier in that the teller and banking customer may reach in all corners of the container to retrieve any small object. However, existing side opening pneumatic carriers have several disadvantages. One type of side opening pneumatic carrier has a door or flap section which is hinged to allow the banking customer access to the carrier. However, such a carrier must include an elaborate latching mechanism to prevent the door from coming ajar or opening during transit, which would cause the carrier to become lodged in the pneumatic tubes and would also allow the contents of the carrier to spill out into the tube system. In addition, the instructions for latching such a container are often not followed, allowing the container to be placed within the tube system without being latched.

In still another type of side opening pneumatic carrier, the access to the carrier is gained by simultaneously pulling and twisting the ends of the carrier to allow the side opening door to be opened. The instructions for such a two-step process are often difficult for many banking customers to follow, and the physical effort and manual dexterity needed to simultaneously pull and twist both ends of the carrier against a spring resistance is often troublesome for many banking customers.

A need has thus arisen for an improved type of pneumatic carrier which overcomes these and other disadvantages associated with such prior art devices. In particular, a need has arisen for a side opening pneumatic carrier which can be easily opened, which cannot be inserted into the remote transaction system unless it is fully closed, and which positively remains closed when within the pneumatic tube.

SUMMARY OF THE INVENTION

The present invention provides an easier opening side opening pneumatic carrier which cannot be inserted into the pneumatic tube delivery system in the partially opening condition. Further, the pneumatic carrier is economical to construct, requiring generally fewer parts to assemble than existing carriers. In addition, the pneumatic carrier is designed to prevent opening of the carrier once it is in transit in the pneumatic tube delivery system.

According to the present invention, a side opening pneumatic carrier has two symmetrical shells of concave cross-sectional area, each shell having first and second longitudinal edges and first and second ends. An internal closure piece is attached to a first end of each of the shells, while an external closure piece is attached to the second end of the shells. The external closure piece is dimensioned to be closely received within the pneumatic tube of the pneumatic tube delivery system. The carrier includes means for securing said symmetrical shells along a first longitudinal edge of said shells, such that the shells are rotatable between a closed position and open position to provide access to the interior of the carrier.

Also in accordance with the present invention, the internal closure pieces of the shells are integrally formed with the shells, and the external closure pieces are also integrally formed with the shells. The symmetrical shells also include means for urging the shells to rotate to a normally closed position, such that the carrier may be inserted within the pneumatic tube delivery system. The symmetrical shells of the pneumatic carrier may be urged to a normally closed position by the combination of a lever arm affixed to the external side of each internal closure piece and a slot formed through each of said external closure pieces for receiving the lever arm of the opposing internal closure piece. Spring means positioned within the external closure piece cooperate with the lever arm to urge the shells towards a closed position.

In another embodiment of the present invention, a one piece side opening pneumatic carrier is provided for use in a pneumatic tube delivery system. The carrier includes two plastic semicylindrical shells having first and second longitudinal edges, a flexible plastic joint integrally formed with the shells, joins the shells together along the first longitudinal edges, such that the shells are rotatable between an open and closed position. An internal closure piece is integrally formed as a first end of each of said shells, and an external closure piece is integrally formed as the opposite end of each of said shells. In the closed position, the internal closure piece of one shell is adjacent the external closure piece of the second shell. The external closure pieces are dimensioned to be closely received within the pneumatic tube delivery system for preventing the entry of the carrier in a partially opened condition.

Also in accordance with the alternate embodiment of the invention, the carrier includes means for securing the shells in the closed position. A raised convex area on the external face of each of the internal closure pieces, and a concave indented area is formed in the internal face of the external closure pieces, such that the concave and convex areas are aligned for engaging one another and securing the shells of the carrier in the closed position.

DESCRIPTION OF THE DRAWINGS

For a more complete understanding of the present invention and further advantages thereof, reference is now made to the following description taken in conjunction with the following drawings:

FIG. 1 is a perspective view of a side opening pneumatic carrier of the present invention disposed within a kiosk;

FIG. 2 is a perspective view of a partially opened side opening pneumatic carrier of the present invention in an upright position;

FIG. 3 is a side view of a closed pneumatic carrier of the present invention;

FIG. 4 is an enlarged partly broken away perspective view of the hinge structure of the present invention taken along the line 4—4 of FIG. 3;

DESCRIPTION OF THE PREFERRED EMBODIMENT

Figure 9:
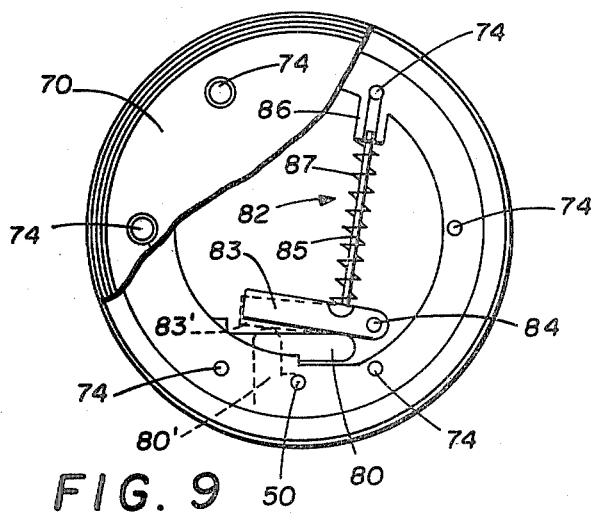
FIG. 9 is a partially cutaway end view of the pneumatic carrier of the present invention taken along the line 9—9 of FIG. 3.

FIG. 1 is a perspective view of a preferred embodiment of a pneumatic carrier of the present invention, generally identified by the reference numeral 10. The pneumatic carrier 10 is shown positioned in a carrier receiver 12 of a typical remote customer transaction terminal 14 for a drive-in motor bank. The transaction terminal 14 also includes a control panel 16, equipped with a teller call button 18 and a carrier send button 20.

The customer transaction terminal 14 is normally situated on an island next to a driveway in order that the banking customer may reach the pneumatic carrier 10 from within the driver's side of the automobile. The customer terminal 14 is normally equipped with a two-way speaker system (not shown) to enable the customer to talk to the teller in a remote banking facility.

The carrier receiver 12 is shown with the pneumatic carrier 10 placed in position to be transmitted to the remote banking facility. In most installations, the customer can send the carrier 10 by depressing the send carrier button 20, or the teller can initiate the command signal from the remote banking facility. The send carrier signal causes the carrier receiver 12 to be rotated in the direction of arrows 22, placing the pneumatic carrier 10 in a round pneumatic tube (not shown) for delivery to the bank teller.

The pneumatic carrier 10 is moved through the pneumatic tube under the action of compressed air against the first or second exterior ends 24 or 26 of the carrier 10. The pneumatic carrier 10 is prevented from opening within the pneumatic tube since the first and second exterior ends 24 and 26 are closely received within the inside diameter of the pneumatic tube. The two semicylindrical shells 28 and 30 are preferably constructed from a clear plastic material like ABS or LEXAN to allow the contents 32 placed within the carrier 10 to be viewed when the carrier 10 is closed.

FIGS. 2 and 3 further illustrate the pneumatic carrier 10 of the present invention. FIG. 2 illustrates the pneumatic carrier 10 in a partially opened position. The carrier 10 is opened by rotating the first semicylindrical shell 28 in the clockwise direction indicated by arrow 34, and the second semicylindrical shell in the direction indicated by arrow 36. In the closed position, a first longitudinal edge 38 of shell 28 and a first longitudinal edge 40 of the second shell 30 abut one another to form a cylindrical shell enclosing the contents of the carrier 10. The longitudinal edges 38 and 40 include stairstep grooves 42 and 44 to frictionally engage one another to ensure positive closure of the semicylindrical shells 28 and 30. Of course, the semicylindrical shells 28 and 30 may, if desired, include means located along the longitudinal edges 38 and 40 to ensure closure of the carrier 10. In addition, the pneumatic carrier 10 is automatically biased in the closed position by a spring assembly as illustrated in FIG. 9 and described further hereinbelow. Finally, internal end pieces 46 and 48 of semicylindrical shells 28 and 30 together with external end pieces 26 and 24 form two semicylindrical containers for holding articles to be transmitted in the pneumatic delivery system.

The semicylindrical shells 28 and 30 include label recesses 52 and 54. Upon rotating the shells 28 and 30 in the directions illustrated by arrows 34 and 36, the outside diameter 56 exceeds the outside diameter 58 of the carrier 10 in the closed position. Since the outside diameter 58 of the exterior ends 26 and 24 is dimensioned to be closely received within the inside diameter of the pneumatic tubes of the pneumatic delivery system, the pneumatic carrier 10 cannot enter the delivery system unless it is in the closed position. Once the pneumatic carrier 10 is inserted in the pneumatic delivery system it is maintained in the closed position.

FIGS. 3 and 4 further illustrate the structure of the pneumatic carrier 10. FIG. 3 is a side view showing the second semicylindrical shell 30. FIG. 4 is a partially broken away view of the carrier 10 along the line 4—4 of FIG. 3. Semicylindrical shell 30 includes integrally formed hinge means 60 spaced along the second longitudinal edge 62, and the semicylindrical shell 28 includes hinge means 64 integrally formed along a second longitudinal edge 65. Semicylindrical shells 28 and 30 are rotationally secured about hinge means 60 and 64 by the hinge pin 50.

The first external end 24 includes a first air ring section 66 integrally formed with the shell 30 and an attached end cover 68. Similarly, the second external end piece 26 includes a second air ring section 70 integrally formed with the cylindrical shell 28, and an end cover 72 attached to the air ring 70. The first and second air ring sections 66 and 70 are dimensioned to have an outside diameter 58 to closely engage the interior walls of the pneumatic tube delivery system to provide an air seal such that compressed air may force the pneumatic carrier 10 through the delivery system. The covers 68 and 72 may comprise a shock absorbing material to cushion the shock of the carrier as it reaches stop positions within the pneumatic tube delivery system.

Figure 5:
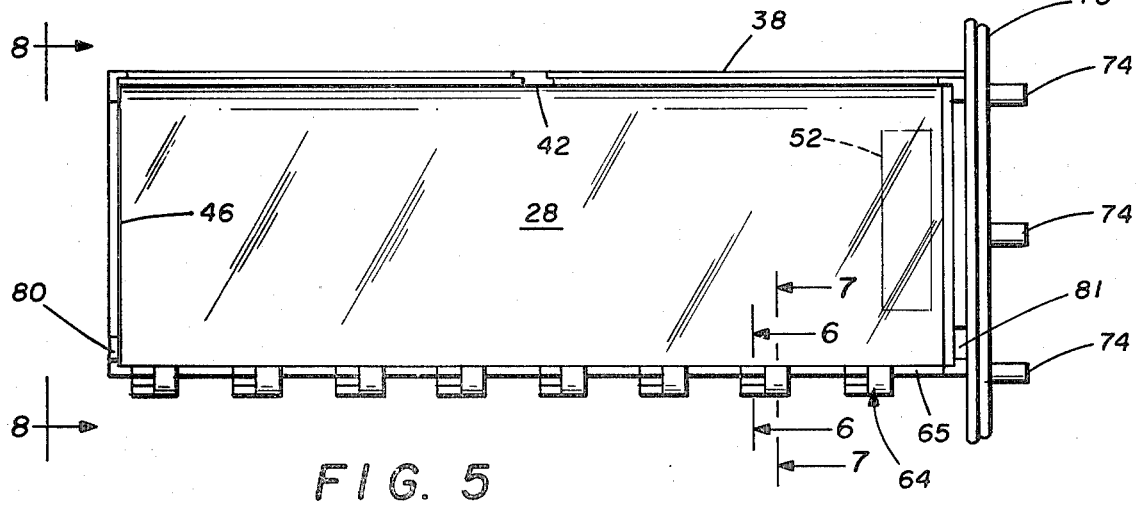
FIG. 5 is a side view of a semicylindrical shell of the pneumatic carrier of the present invention.

FIG. 5 is a side view of the semicylindrical shell 28 of the pneumatic carrier 10. The hinge means 64 are spaced along the second longitudinal edge 65 of the shell 28, such that hinge means 60 may align with the spaces between the hinge means 64 for securing the two shell halves 28 and 30 together for rotation about the hinge pin 50.

The second air ring 70 includes end cover posts 74 for securing the end cover 72 to the air ring 70. The end cover 72 is preferably constructed from the same plastic material, e.g., ABS or LEXAN, as the body of the semicylindrical shell 28. The end cover 72 may be secured to the air ring 70 by an ultrasonic weld applied to the end cover posts 74.

Figure 6:
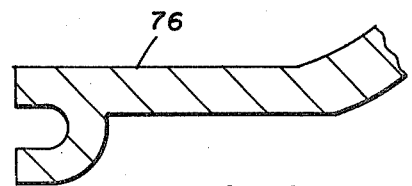
FIG. 6 is an enlarged view of a portion of the hinge structure of the present invention taken along the line 6—6 of FIG. 5.
Figure 7:
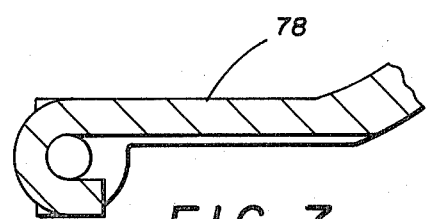
FIG. 7 is an enlarged view of a portion of the hinge structure of the present invention taken along line 7—7 of FIG. 5.

The hinge means 64 is integrally formed to the semicylindrical shell 28, and further illustrated in FIGS. 6 and 7. FIG. 6 illustrates the cross-sectional view of the yoke-shaped member 76, and FIG. 7 illustrates the generally J-shaped portion 78 of the hinge means 64. The yoke-shaped and J-shaped portions 76 and 78 are configured to allow the shell 28 and hinge means 64 to be integrally formed from a single plastic mold. Previously, hinges have been formed from machining a hole through a solid generally cylindrical body or by designing a mold with a pin to be drawn out to form the opening of the hinge. Such prior art techniques are time consuming and result in higher mold costs. The hinge means 64 overcomes these problems by allowing the shell and hinge means to be pulled straight from the mold.

Figure 8:
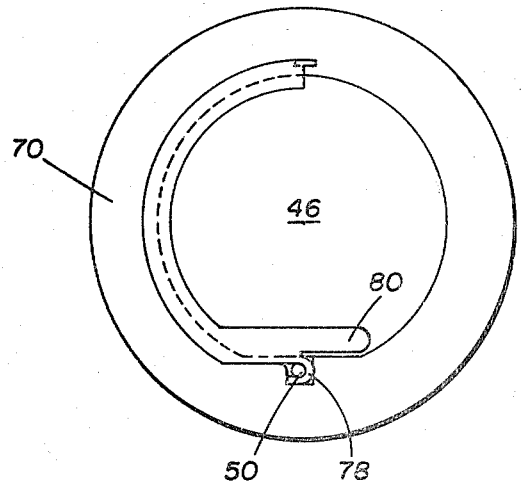
FIG. 8 is an end view of the semicylindrical shell of FIG. 5 taken along the line 8—8.

FIG. 8 is an end view of the semicylindrical shell taken along the line 8—8 of FIG. 5. FIG. 8 shows an end view of the internal end piece 46 surrounded by a portion of the second air ring 70. The internal end piece 46 includes an integral lever arm 80 to be received through an opening within the opposing air ring 66 of first exterior end piece 24 of semicylindrical shell 30.

Similarly, an integral lever arm 80 (FIG. 9) is integrally formed to the internal end piece 48 of shell 30 for cooperation within an opening 81 of the air ring 70.

FIG. 9 is a partially broken away end view of the pneumatic carrier 10 taken along the line 9—9 of FIG. 3. The end cover 72 is attached to the second air ring 70 by ultrasonically welding the six end cover posts 74. A spring assembly 82 engages the lever arm 80 with the carrier 10 in the closed position. The lever arm 80 of the internal end piece 48 of shell 30 is received within the opening 81 of air ring 70 for cooperation with the spring assembly 82. The spring assembly 82 engages the lever arm 80 to positively bias the pneumatic cylinder 10 in the closed position.

The spring assembly 82 includes a lever arm follower 83 secured for rotation about a pivot post 84. A spring guide 85 is positioned between a notch in the follower 83 and a spring guide and retainer 86. A compression spring 87 forces the follower 83 against the lever arm 80.

In the opened position the lever arm 80 moves to 80' and the lever follower 83 moves to 83'. The spring action of closing or opening the carrier will occur at the midpoint between the fully opened or the fully closed position.

Of course the air ring 66 includes a similar arrangement of a lever arm 80 and spring assembly 82 to urge the carrier 10 toward a closed or open position and the spring assembly 82 could be replaced by other spring assemblies, such as a leaf spring or coiled spring assembly. However, the carrier 10 may include only one air ring and closure assembly for smaller carriers, such as the two (2) inch diameter carriers used in some pneumatic systems.

Figure 10:
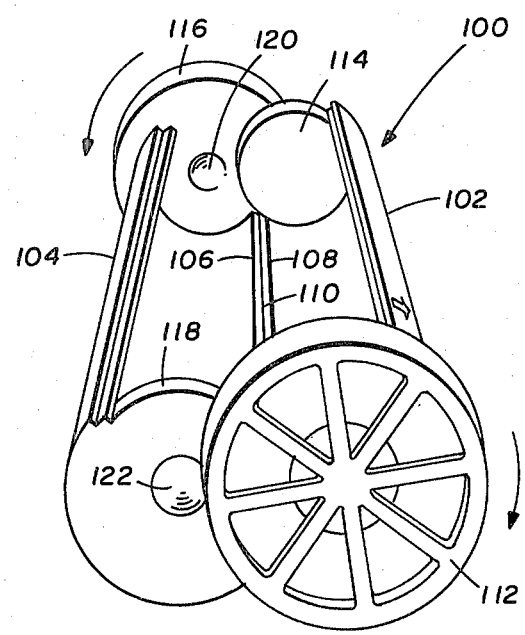
FIG. 10 is an alternate embodiment of a side opening pneumatic carrier of the present invention.

FIG. 10 is an alternate embodiment of the pneumatic carrier of the present invention, generally indicated by the reference numeral 100. Two semicylindrical shells 102 and 104 are joined for rotation along longitudinal edges 106 and 108 by hinge means 110. The hinge means 110 is integrally formed with the two shells 102 and 104 to form a carrier 100 which is an integral unit which can be formed from a single mold. Of course, the carrier 100 can be formed from two separate shells 102 and 104 joined by a separate hinge means, such as hinge means 64 of FIG. 4.

The semicylindrical shell 102 includes an exterior end piece 112 and an interior end piece 114 for forming a semicylindrical container for holding the articles to be transmitted by the pneumatic carrier 100. Similarly, the semicylindrical shell 104 includes an external end piece 116 and an internal end piece 118 for forming another semicylindrical container. The external end pieces 112 and 116 include a centrally located concave surface 120 for being received within an opposing convex surface 122 centrally located on the opposing face of internal end pieces 114 and 118.

The pneumatic carrier 100 has cylindrical shells 102 and 104 attached by hinge means 110 about longitudinal edges 106 and 108, such that the outside diameter of the pneumatic carrier 100 exceeds the outside diameter of the external end pieces 112 and 116 in opening the carrier 100. In this manner, the pneumatic carrier 100 is assured of being in the closed position when inserted into the pneumatic tube delivery system, and the carrier 100 must remain in the closed position at all times it is within the pneumatic tube. The hinge means 110 can be any suitable hinge structure including a living plastic hinge integrally formed to shells 102 and 104. Thus, the carrier 100 can be molded as a single piece of plastic from a plastic injection mold.

In operation, the pneumatic carrier 10 is positioned within the carrier receiver 12 of a customer receiver terminal 14. A drive-in banking customer driving up to the customer receiver terminal 14 is able to reach the pneumatic carrier 10 from within his car. The pneumatic carrier 10 is normally in the closed position within the receiver terminal 14 by the interaction of the lever arms 80 and the leaf springs 82.

In order to open the pneumatic carrier 10, the customer simply places his right hand about the second external end piece 26 and his left hand about the first external end piece 24 with the first longitudinal edges 38 and 40 facing him. Instructions printed on the outside of the shells 28 and 30 indicate that the pneumatic carrier 10 may be opened by twisting the shells in opposite directions. The leaf springs 82 maintain the carrier 10 in the fully opened position until the customer has deposited the banking transaction articles inside the carrier 10. Carrier 10 is then closed by rotating the ends 24 and 26 in the opposite direction for opening the carrier 10. Once the closing action is at the midpoint, the leaf springs 82 will continue to urge the semicylindrical shells 28 and 30 to rotate into the closed position. Of course, the shells 28 and 30 may be oriented such that the carrier 10 is opened by rotating the shells in the opposite direction than that shown.

If the customer attempts to place the carrier 10 into the customer transaction terminal 14 in a partially opened position, the outside diameter 56 of the carrier 10 will exceed that of the diameter of the pneumatic tube, and the carrier 10 cannot enter the system. Once a properly closed pneumatic carrier 10 enters the system, the internal walls of the pneumatic tubes closely engage the air rings 66 and 70 of the end pieces 24 and 26 to prevent accidental opening of the carrier within the system. Thus, the pneumatic carrier 10 of the present invention provides an easily opened side opening pneumatic carrier, which is designed to prevent entry of the carrier into the system unless it is fully closed and which prevents accidental opening of the carrier within the pneumatic delivery system.

While the preferred embodiments of the invention have been illustrated in the accompanying drawings and described in the foregoing detailed description, it will be understood that the invention is not limited to the embodiments disclosed, but it is capable of numerous rearrangements, modifications, and substitutions of parts and elements without departing from the spirit of the invention.

What is claimed is:

1. A side opening pneumatic carrier for use in a pneumatic tube delivery system, comprising:
   two symmetrical shells of concave cross-sectional area, each of said shells having first and second longitudinal edges and first and second ends;
   an internal closure piece attached to a first end of each of said shells;
   an external closure piece attached to the second end of each of said shells, said external closure piece being dimensioned to be closely received within the pneumatic tube delivery system;
   means for pivotally securing said symmetrical shells along a first longitudinal edge of each of said shells, such that said shells are rotatable between a closed position where said second longitudinal edges are adjacent one another and an open position where said second longitudinal edges are separated to provide access to the interior of the pneumatic carrier;
   a lever arm affixed to the external side of each of said internal closure pieces;
   an opening formed through each of said external closure pieces for receiving said lever arm when said means for securing joins said shells together; and
   spring means positioned within the external closure pieces, said spring means cooperating with said lever arms to urge said shells toward the closed position.

2. The side opening pneumatic carrier of claim 1, and further comprising end caps secured to each of said external closure pieces.

3. The side opening pneumatic carrier of claim 2, wherein said end caps include shock absorbing means, such that the shock transmitted to the pneumatic carrier by the pneumatic tube delivery system is absorbed by said shock absorbing means.

* * * * *